United States Patent [19]

Bloedel-Pawlik et al.

[11] Patent Number: 5,666,805
[45] Date of Patent: Sep. 16, 1997

[54] EMISSION CONTROL SYSTEM FOR INTERNAL-COMBUSTION ENGINES

[75] Inventors: Juergen Bloedel-Pawlik, Gersthofen; Wolfgang Fanese; Rudolf Flierl, both of Munich; Enrique Santiago, Diedorf; Ernst Krieger, Aichach; Bernhard Grescher, Fischach, all of Germany

[73] Assignee: Bayerische Motoren Werke Aktiengesellschaft, Germany

[21] Appl. No.: 549,736

[22] PCT Filed: Feb. 22, 1995

[86] PCT No.: PCT/EP95/00636

§ 371 Date: Jan. 23, 1996

§ 102(e) Date: Jan. 23, 1996

[87] PCT Pub. No.: WO95/24546

PCT Pub. Date: Sep. 14, 1995

[30] Foreign Application Priority Data

Mar. 10, 1994 [DE] Germany ............ 44 08 130.8

[51] Int. Cl.$^6$ ........................... F01N 3/28
[52] U.S. Cl. .................. 60/299; 422/176; 422/180
[58] Field of Search ................ 60/299; 422/180, 422/176

[56] References Cited

U.S. PATENT DOCUMENTS

| | | | |
|---|---|---|---|
| 3,929,419 | 12/1975 | Chapman | 60/299 |
| 4,206,178 | 6/1980 | Oya | 60/299 |
| 4,264,561 | 4/1981 | Goedicke | 60/299 |
| 5,144,797 | 9/1992 | Swars | 60/299 |
| 5,330,728 | 7/1994 | Foster | 60/299 |

FOREIGN PATENT DOCUMENTS

| | | |
|---|---|---|
| 0 420 462 | 4/1991 | European Pat. Off. |
| 23 11 475 | 10/1973 | Germany. |

*Primary Examiner*—Douglas Hart
*Attorney, Agent, or Firm*—Evenson, McKeown, Edwards & Lenahan, P.L.L.C.

[57] ABSTRACT

An emission control system for internal-combustion engines has a purifying insert which is arranged in a housing by way of an intermediate layer and whose inflow-side front side is subjected to a diagonal flow by way of an inflow pipe, to achieve a simple connection of the inflow pipe and the housing, the inflow pipe has a section which represents a boundary around the insert downstream of its front side and is used as a connection with the housing.

16 Claims, 1 Drawing Sheet

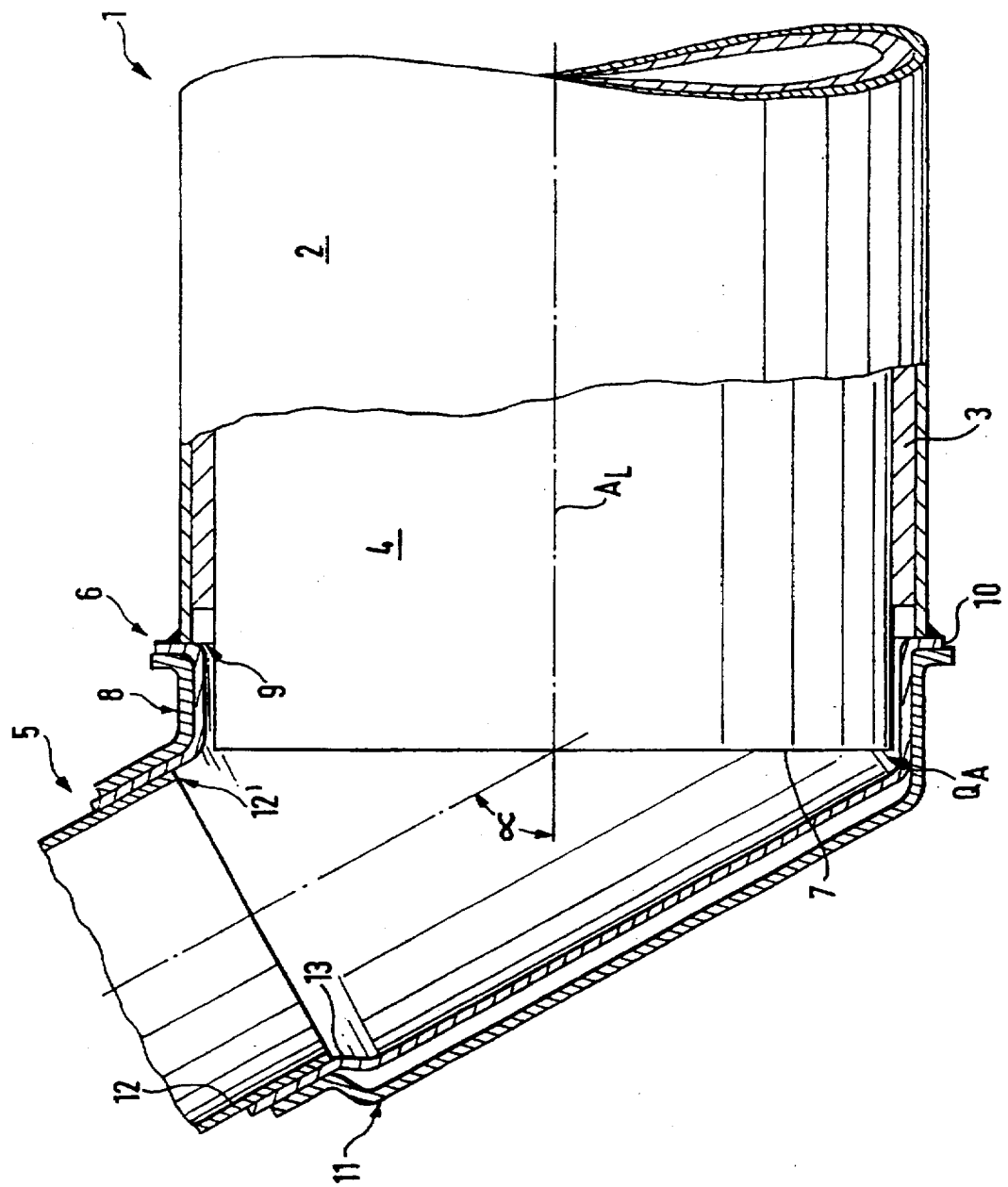

EMISSION CONTROL SYSTEM FOR INTERNAL-COMBUSTION ENGINES

BACKGROUND AND SUMMARY OF THE INVENTION

The present invention relates to an emission control system for internal-combustion engines in which a purifying insert, e.g. a monolith, is arranged in a housing with an intermediate layer.

In a known emission control system, the catalyst support body used as the purifying insert receives a diagonal flow against a front side, so that, for an optimal flow against the front side, the entire front side is situated in the connection cross-section of the diagonally directed inflow pipe. For arranging the diagonal inflow pipe on a front side of the housing, the inflow pipe has, at least in areas, edge areas of the connection cross-section which are directed transversely with respect to the housing shell. A permanent connection of these edge areas, which partially cross the shell front sides, with the shell of the housing requires high expenditures of effort and cost.

It is an object of the invention to configure the connection of an exhaust gas inflow pipe with the housing accommodating a purifying insert in a simpler manner while a large-surface diagonal flow against the front side of the support body is taken into account.

This object is achieved in accordance with the present invention by providing that the inflow pipe has a section which represents a boundary around the insert downstream of its front side and is used for a connection with the housing.

The arrangement of a housing section on the exhaust gas inflow pipe according to the invention provides a simplified connection of the two components in an advantageous manner while the diagonal flow against the purifying insert is optimal.

With respect to manufacture of the system, the connection is simplified by configuring the connecting section of the inflow pipe as a boundary around the insert with play while, in sections, a flexible intermediate layer is omitted. This free outer circumference section of the insert may have the result that a plastic ring, which during the operation of the internal-combustion engine burns up without any residue, supports in an advantageous manner the center of the connecting section during assembly of the system and in the supporting process may also protect the front edge of the insert.

With a view to an advantageous embodiment which is appropriate for automatic devices, the connecting section of the inflow pipe can have a connecting flange extending transversely to the connection-side front side of the housing. As a result, tight fillet joints for a close material connection can be used which are obtained with low expenditures of material. A correspondingly selected radius between the connecting section and the connecting flange can advantageously facilitate the above-mentioned centering.

The additional suggestion according to the invention of configuring the connection part of the inflow pipe which has the connecting section as a separate funnel results in the advantage that the connecting section can be formed out as a true-to-size housing section.

In another embodiment of the connection, the connecting section of the inflow pipe or of the funnel in the house-side end section has a flange which can be centered on the outer contour of the housing.

For achieving a large-surface diagonal flow against the insert, a pipe, end section of the inflow pipe can be arranged in an opening of the funnel in that it is inserted in such a manner that, by way of the pipe end section which is adjacent closest to the front side of the insert, acting upon the extreme edge area of the front side of the insert is ensured.

BRIEF DESCRIPTION OF THE DRAWINGS

These and other objects, features and advantages of the present invention will be described in detail below in conjunction with the accompanying sole FIGURE which is a partial cross-sectional view of an emission control system for an internal combustion engine.

DETAILED DESCRIPTION OF THE DRAWINGS

A system designated generally by the numeral 1 for emission control comprises a purifying insert 4 which is arranged in a housing 2 by way of a flexible intermediate layer 3 and is configured, for example, as a monolith. An exhaust gas inflow pipe designated generally by the numeral 5 is arranged on one end of the housing 2 while forming an angle $\alpha$ with respect to the longitudinal axis ($A_L$) of the insert 4. The angle is smaller than 90°. In the housing connection area, the inflow pipe 5 has a cross-section ($Q_A$) which corresponds to the inflow-side front side 7 of the insert 4.

For achieving a simple connection of the inflow pipe 5 with the housing 2, the inflow pipe 5 has a section designated generally by the numeral 8 which constitutes a boundary around the insert 4 downstream of a front side 7 thereof and is used for a connection with the housing 2. The connecting section 8, which is configured essentially to correspond to the contour of the adjoining housing 2, is a boundary around the insert 4 while, in sections, leaves out the flexible intermediate layer 3 with an amount of play which is selected so that, during the operation, the insert 4 is prevented from striking against the connecting section 8. In addition, in this outer circumferential area of the insert 4, which is free of the intermediate layer 3, before the mounting of the connecting section 8, a plastic ring (not shown) can be provided to center the connecting section 8 and burn up without any residue during the operation of the internal-combustion engine. Also, by way of this play, a protection of the elastic intermediate layer 3 is advantageously achieved which is particularly advantageous when the intermediate layer 3 is constructed as an inflated mat.

For achieving a simple connection with favorable handling for purposes of manufacturing, the connecting section 8 of the inflow pipe 5 has a connecting flange 10 which extends transversely to the connection-side front side 9 of the housing 2. Although the material expenditures are low, a tight fillet joint for a close connection of the materials of components 5 and 2 is achieved. A corresponding transition to the connecting flange 10 facilitates the above-mentioned centering.

In a currently preferred embodiment, the connection part of the inflow pipe 5 which has the connecting section 8 is formed out as a separate funnel 11. As a result, the connecting section 8 can be formed out as a true-to-size housing section.

Finally, in order to achieve a large-surface diagonal approach flow for an exhaust gas through-flow achieved along the entire cross-section of the insert 4, a pipe end section 12 of the inflow pipe 5 is inserted in an opening 13 of the funnel 11 so that, by way of the pipe end section 12' which is adjacent closest to the front side 7 of the insert 4, the extreme edge area of the front side 7 of the insert is also acted upon.

Within the framework of the invention, the connecting section of the inflow pipe or of the funnel in the housing-side end section may also have a flange which can be centered on the exterior contour of the housing.

The insert 4 of the system 1 is used for the catalytic and/or thermal purification of exhaust gases of a gasoline or diesel engine.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An emission control system for an internal-combustion engine, comprising a purifying insert arranged in a housing via an intermediate layer, an exhaust gas inflow pipe arranged on one end of the housing at an oblique angle with respect to a longitudinal axis of the insert, and a housing connection area having a cross-section which corresponds to an inflow-side front side of the insert, wherein the exhaust gas inflow pipe has a section constituting a boundary around the insert downstream of the front side and operative as a connection with the housing.

2. The system according to claim 1, wherein the connecting section of the inflow pipe constitutes a boundary around the insert with play while, in sections, leaving out a flexible intermediate layer.

3. The system according to claim 1, wherein the connecting section of the inflow pipe has a connecting flange which extends transversely with respect to the connection-side front side of the housing.

4. The system according to claim 3, wherein the connecting section of the inflow pipe constitutes a boundary around the insert with play while, in sections, leaving out a flexible intermediate layer.

5. The system according to claim 1, wherein the connection part of the inflow pipe having the connecting section constitutes a separate funnel.

6. The system according to claim 5, wherein the connecting section of the inflow pipe constitutes a boundary around the insert with play while, in sections, leaving out a flexible intermediate layer.

7. The system according to claim 6, wherein the connecting section of the inflow pipe has a connecting flange which extends transversely with respect to the connection-side front side of the housing.

8. The system according to claim 1, wherein a pipe end section of the inflow pipe is insertably arranged in an opening of the funnel so that, via the pipe end section adjacent closest to the front side of the insert, an extreme edge area of the front side of the insert is acted upon.

9. The system according to claim 8, wherein the connecting section of the inflow pipe constitutes a boundary around the insert with play while, in sections, leaving out a flexible intermediate layer.

10. The system according to claim 9, wherein the connecting section of the inflow pipe has a connecting flange which extends transversely with respect to the connection-side front side of the housing.

11. The system according to claim 10, wherein the connection part of the inflow pipe having the connecting section constitutes a separate funnel.

12. The system according to claim 1, wherein the connecting section of one of the inflow pipe and the funnel in the housing-side end section has a flange centered on an outer contour of the housing.

13. The system according to claim 12, wherein the connecting section of the inflow pipe constitutes a boundary around the insert with play while, in sections, leaving out a flexible intermediate layer.

14. The system according to claim 13, wherein the connecting section of the inflow pipe has a connecting flange which extends transversely with respect to the connection-side front side of the housing.

15. The system according to claim 14, wherein the connection part of the inflow pipe having the connecting section constitutes a separate funnel.

16. The system according to claim 15, wherein a pipe end section of the inflow pipe is insertably arranged in an opening of the funnel so that, via the pipe end section adjacent closest to the front side of the insert, an extreme edge area of the front side of the insert is acted upon.

* * * * *